July 30, 1946.                    J. R. SNYDER                    2,404,816
                                  SEAL SURFACES
                              Filed Jan. 8, 1945
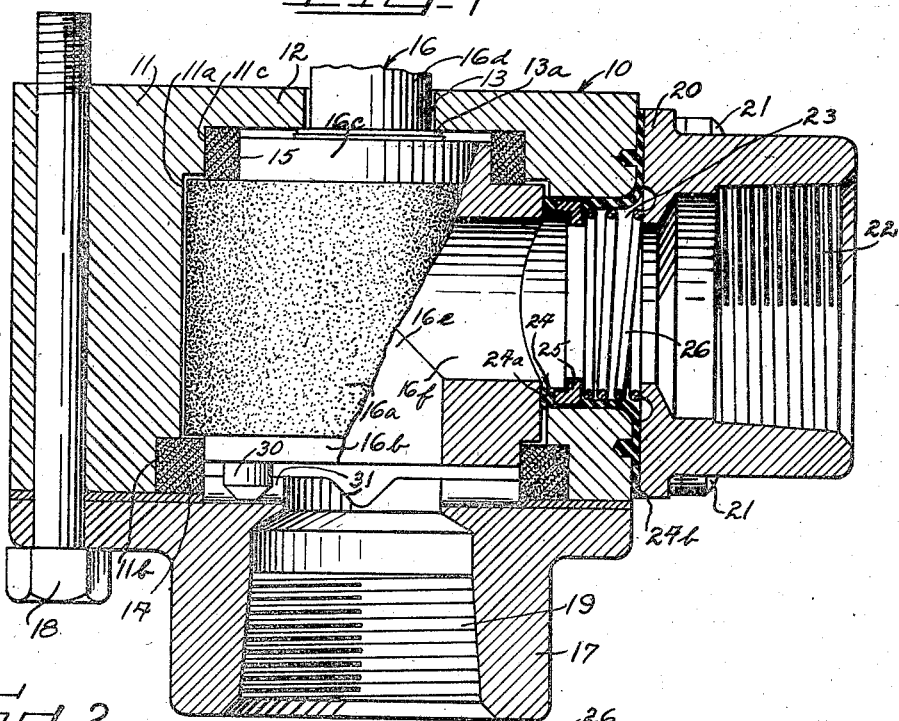
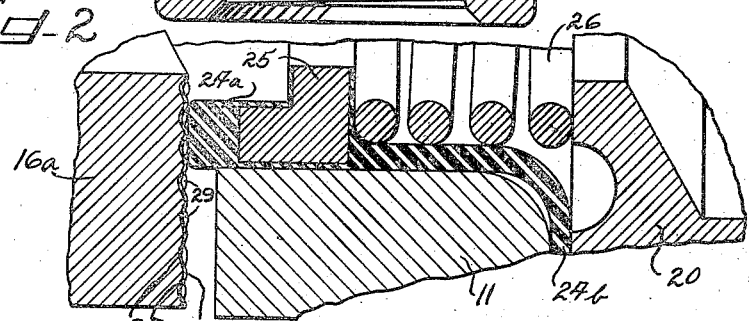
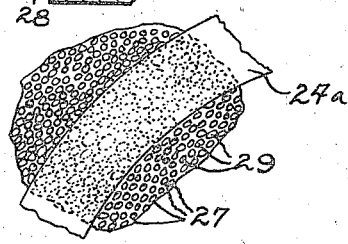
Inventor
Jacob Rush Snyder Patented July 30, 1946

2,404,816

UNITED STATES PATENT OFFICE 2,404,816

SEAL SURFACE

Jacob Rush Snyder, Cleveland, Ohio, assignor to Thompson Products, Inc., Cleveland, Ohio, a corporation of Ohio Application January 8, 1945, Serial No. 571,834

6 Claims. (Cl. 251—113)

This invention relates to surfaces especially adapted for cooperating with seals to decrease wear and friction losses without decreasing sealing efficiency.

Specifically this invention deals with a selector valve, shut-off cock, or other ported valve having a rotatable plug or valve member with a shot-blasted, sandblasted or otherwise pitted surface engaging the port seal for decreasing torque loads required to rotate the valve without decreasing the sealing efficiency of the port seal.

Heretofore, metal sealing surfaces for engagement with rubber or other plastic material seals were provided with a smooth surface to insure good sealing contact. According to this invention, however, metal surfaces for engaging rubber or other plastic seals are pitted as by grit-blasting or the like. These pitted surfaces are preferably plated with a metal such as nickel or chromium. If aluminum is used its pitted surface can be anodized. The nickel or other coating does not form a smooth, flat surface but follows the contour of the pits formed by grit-blasting, while smoothing off any sharp edges.

Contrary to expectations, the pitted metal surfaces of this invention provide very efficient seal surfaces for coacting with rubber or other plastic material seals. These pitted surfaces effect increased wear life for the seals and decreased torque loads for operation of the valve.

It has been found that smooth finished metal plug or valve surfaces develop a vacuum as they pass over the sealing areas of plastic seals, and this vacuum actually tears and pulls off the plastic material, resulting in a very high wear rate of seals and increased seal leakages. In addition the vacuum developed between the smooth surfaces and the plastic seals increases the torque load for movement of the plug. The pitted surfaces, however, break the vacuum without breaking the seal and carry liquids or other material flowing through the valves over the face of the seal, thereby lubricating the seal.

It is, then, an object of this invention to provide seal surfaces having a myriad of pits or depressions free from sharp edges for sealing engagement with rubber or other plastic material seals.

A further object of the invention is to provide a valve with a rotatable valve member having a sandblasted surface for sealing engagement with rubber seals to break the vacuum normally encountered between valve surfaces and seals.

A still further object of this invention is to provide valves with rotatable plugs having sandblasted and plated metal surfaces for engaging the seals of the valve.

Another object of the invention is to provide valves having rotatable plugs wherein the seal-engaging surfaces of the plugs are sandblasted and then treated to smooth off sharp edges.

A specific object of the invention is to provide a valve with a rotatable valve plug having a sandblasted surface coacting with a plastic material seal which surface has been covered with a plated metal to smooth off any sharp edges thereon.

Another object of the invention is to provide a shut-off cock or valve especially adapted for regulating flow of gasoline or other aromatic fluid which includes a rotatable valve plug having a nickel plated sandblasted surface in sealing engagement with a synthetic rubber seal.

Other and further objects of this invention will be apparent to those skilled in the art from the following detailed description of the annexed sheet of drawings which, by way of a preferred example only, illustrates one embodiment of the invention.

On the drawing:

Figure 1 is a vertical cross-sectional view, with parts in elevation, of a selector valve equipped with a sandblasted and metal plated valve plug in accordance with this invention.

Figure 2 is an enlarged fragmentary vertical cross-sectional view illustrating the coaction between the sandblasted plug and rubber seal of the valve shown in Figure 1.

Figure 3 is a fragmentary plan view diagrammatically illustrating the sandblasted plug and the seal of the valve shown in Figures 1 and 2.

As shown on the drawing:

In Figure 1, the reference numeral 10 designates generally a valve having a body member 11 with a cylindrical bore 11a extending inwardly from one face thereof and defining a valve operating chamber. The bore 11a is counterbored as at 11b at one face of the body and has a reduced-diameter portion 11c at the other end thereof terminating in an end wall portion 12 which is apertured at 13 to provide a reduced opening in the other face of the body. The counterbore 11b has a first carbon bearing ring 14 therein. The reduced diameter portion 11c has a second carbon bearing ring 15 therein.

A valve plug 16 has a main cylindrical portion 16a with reduced-diameter ends 16b and 16c together with a stem 16d projecting from the central portion of the reduced end 16c. The reduced end 16b is rotatably mounted in the carbon bearing ring 14. The reduced end 16c is rotatably mounted in the carbon ring 15. The stem 16d projects freely through the aperture 13 and leakage around the stem is stopped by a seal 13a such as a rubber O ring in a metal cup spring pressed against the end wall 12.

The main cylindrical portion 16a is freely disposed in the bore 11a.

An end cover 17 is secured on the bottom face of the body 11. Bolts such as 18 are passed through the cover 17 and body 11 and serve to mount the valve 10 on a support (not shown). The cover has an outlet 19 arranged for flowing fluids or other material out of the valve body 11. The plug 16 has an axial outlet passage 16e aligned with the outlet 19 together with a radial inlet passage 16f. This inlet passage 16f opens through the main cylindrical portion 16a of the plug.

A nipple 20 is bolted to a side face of the body 11 as by means of bolts 21 or the like. This nipple provides a radial inlet 22 for the valve body communicating with an inlet port 23 in the side wall of the valve body.

The inlet port 23 receives a seal assembly 24 composed of a rubber sleeve 24a having an end wall arranged to engage the main portion 16a of the plug 16. A metal ring 25 is embedded in this sleeve to rigidify the sealing end of the sleeve but the end which engages the plug is composed of rubber. The sleeve 24 has an outturned flange 24b disposed between the nipple member 20 and the side wall of the body 10. A coil spring 26 is mounted in the sleeve portion 24 and bottomed on the nipple 20 to act against the embedded metal ring 25 of the seal for urging the end face of the seal against the portion 16a of the plug valve.

In accordance with this invention, and as best shown in Figures 2 and 3, the portion 16a of the plug valve is sand-blasted to form a plurality of pits 27 in the surface thereof. The pitted surface is treated to form a protecting film 28 thereover. This film 28 can be composed of electrodeposited nickel, chromium, or the like. If desired, aluminum valve plugs can have the sandblasted portions thereof anodized to provide a protecting coating of aluminum oxide thereon.

The protective coating 28 is of uniform thickness and follows the contour of the pitted surface, but smoothes off any sharp edges, so that the finished plug surface has a smooth pitted surface free from cutting edges that might roughen or cut the rubber seal.

The end wall of sleeve portion 24a of the rubber seal 24 rides on the plated pitted surface 16a of the plug 16 and the pits provide pockets or wells 29 capable of carrying fluid such as gasoline, oil or the like passing through the valve over the sealing face of the seal. If the valve is dry, these pockets 29 will carry air across the face of the seal.

The pockets 29 are of such a minute size that no bleeder channels can be provided across the entire face of the seal. Each pocket is independent of the next adjacent pocket, and the protecting layer 28 on the valve will have a plurality of spaced localized contacts with the seal since the spring 26 is not strong enough and the rubber of sleeve 24a is not soft enough to allow the rubber to fill the pits.

In order to position the passage 16f of the valve plug 16 relative to the ports in the casing 11, one or more spring-pressed plunger pins such as 30 can be provided in an end face of the valve plug for coacting with recesses such as 31 in the cover 17. The plunger and recesses serve as position finders for the valve plug.

The pitted valve surface provided in accordance with this invention substantially eliminates all tendencies for pulling off the rubber sealing surface by vacuum created between the valve and the rubber seal. The pits act as liquid or air pockets, depending on whether or not the valve is being operated wet or dry, and the liquid or air in the pockets permits the surface of the valve to glide over the rubber-like seal material substantially free from a vacuum pull. As a result, the operating torque for the valve is materially lowered, the rubber shows no appreciable wear after repeated operation of the valve, and the sealing effectiveness is maintained.

While the seal 24 has been described as a rubber seal, it should be understood that any suitable sealing material can be used. Where the valve is intended for use with aromatic fluids, synthetic rubber such as neoprene or the like are used. Of course, any synthetic rubber-like material is to be included within the meaning of the term "rubber" as used herein.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a seal assembly including a deformable seal and a metal part in sealing engagement therewith, the improvement of a myriad of pits in the surface of said metal part and a protective coating on said surface following the contour of said pits and providing a smooth pitted surface for sealing engagement with said seal.

2. In a seal assembly including a rubber seal and a metal member sealed by said rubber seal, the improvement of a myriad of minute individual pits in the surface of said metal member effective for conveying air or liquid over the surface of said seal for lubricating said surface without destroying the seal between the metal parts and the seal.

3. In a seal assembly, relatively movable parts in sealing engagement, one of said parts being deformable, the other of said parts being rigid and having a minutely pitted surface in sealing contact with said deformable part.

4. In a seal assembly, a rubber seal, a metal valve coacting with said rubber seal, said metal valve having a sandblasted surface for engaging said rubber seal, and an electrodeposited coating of metal on said sandblasted surface following the contour of the pits therein to smooth off any sharp surfaces without filling the pits.

5. In a valve, a casing having a port therein, a rubber seal in said port, a metal valve plug rotatably mounted in said casing, a spring urging said rubber seal against said metal valve plug, and said metal valve plug having a grit-blasted surface for sealing engagement with said rubber seal.

6. In a valve assembly including a casing having a port therein, a rubber seal for said port, a valve plug rotatably mounted in said casing in sealing engagement with said rubber seal, said valve plug having a pitted surface for engagement with said seal, said pits forming individual pockets for conveying liquid or air over the face of the seal to prevent formation of a vacuum on the seal surface, and a coating of protective material on said pitted surface smoothing off any sharp edges but following the contour of the pits without filling the pits.

JACOB RUSH SNYDER.